Sept. 21, 1954  T. F. CARLSON  2,689,756
COUPLING MEANS FOR RELATIVELY OSCILLATING MEMBERS
Filed Oct. 15, 1953
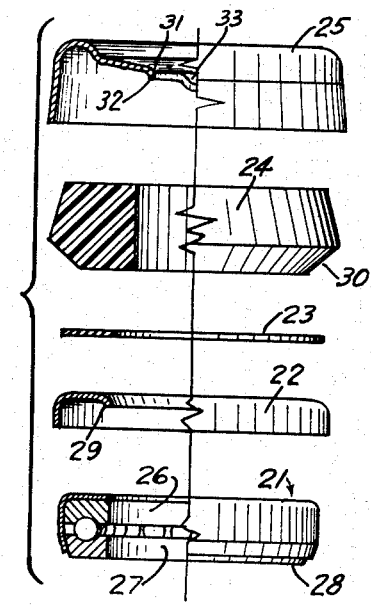
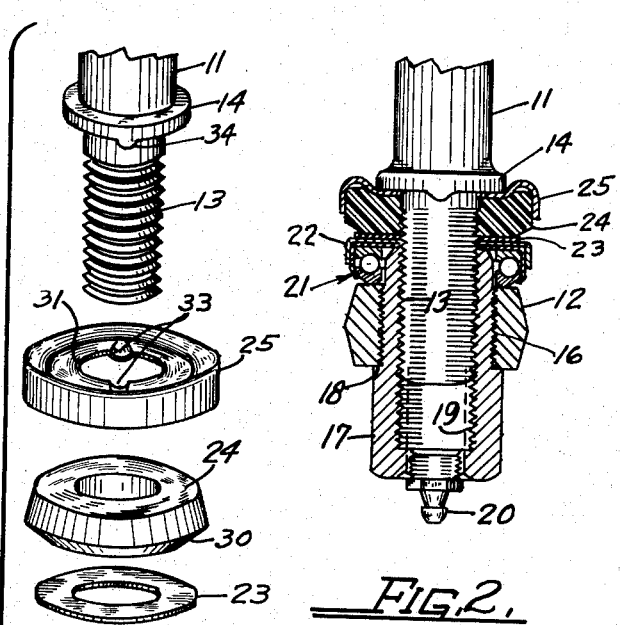
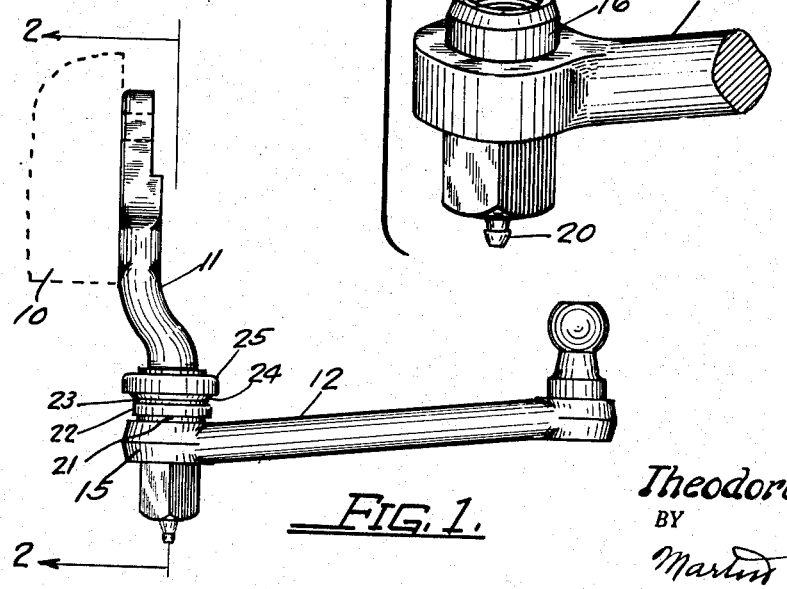
INVENTOR.
Theodore F. Carlson
BY
Martin E. Anderson
ATTORNEY Patented Sept. 21, 1954

2,689,756

UNITED STATES PATENT OFFICE 2,689,756

COUPLING MEANS FOR RELATIVELY OSCILLATING MEMBERS

Theodore F. Carlson, Englewood, Colo.

Application October 15, 1953, Serial No. 386,271

4 Claims. (Cl. 287—93)

This invention relates to improvements in coupling means for relatively oscillating members and has reference in greater particular to bearings for steering gear idler arms of the type shown in U. S. Patent 2,464,982.

The steering mechanisms of practically all automobiles comprise a steering shaft controlled by the pilot through the medium of a steering wheel and carries at its lower end a crank arm. A drag link is connected at one end to the crank arm and the wheel mountings are connected with the drag link by steering arms and tie rods.

Since the steering shaft and crank arm are positioned adjacent the left side of the automobile the right hand end of the drag link was for some time left unsupported; this has now been remedied by providing an idler arm pivotally supported from the chassis frame at the right side thereof and the right hand end of the drag link is pivotally connected with the free end of the idler arm, all as shown in the patent above identified.

The idler arm is supported from the chassis frame by a bracket to the lower end of which the idler arm is connected for pivotation and it is to the construction of this pivotal bearing that this invention relates.

In order to explain the invention, its construction, advantages and mode of operation, reference will now be had to the accompanying drawing in which the invention has been illustrated and in which, Figure 1 is a side elevational view showing the idler arm and its supporting bracket.

Figure 2 is a cross section taken on line 2—2 Figure 1 and shows the parts to an enlarged scale.

Figure 3 is an exploded view and shows the several elements detached from each other and in the relationship shown in Figure 2, and Figure 4 is an exploded view showing the bearing elements that are positioned above the idler arm, partly in elevation and partly in section and to substantially full size.

Referring now to the drawing, reference numeral 10 designates that portion of the chassis frame to which the bracket 11 is connected. The lower end of bracket 11 terminates in a threaded section 13 as shown most clearly in Figure 2, to which reference will now be had. The threaded section terminates in a peripheral flange or rib 14. The larger end of the idler arm 12, has been designated by numeral 15, has a threaded opening 16 in which is positioned an elongated cup-like bearing 17, whose outer surface has a threaded section 18 that cooperates with the threads in opening 16 of the idler arm. The wall of the axial opening 19 is threaded for the reception of the threaded end 13 of the bracket as shown in Figure 2. The bottom of opening 19 is provided with a small threaded opening for the reception of a grease nipple 20. It has been found advantageous to have the threads on the outside of the bearing opposite from those on the inside, thus, if one is right hand, the other is left hand or reverse.

It has been customary to employ a bearing comprising part 17 only in which the threaded plug 13 oscillated and to provide a rubber grease seal ring at the top of the bearing. Such simple bearings, however, have not proved satisfactory.

This invention comprises the addition of a ball bearing assembly 21, a bearing retainer washer 22, a washer 23, a grease seal ring 24 and a top cupped washer 25 arranged in the order shown in Figure 3.

From Figures 2 and 3 it will be seen that bearing 17 has a cylindrical unthreaded portion that projects above the idler arm and that the ball bearing surrounds this portion as shown. The other parts are positioned in the order mentioned above and shown on the drawing. The bracket is screwed into the bearing nut until the grease seal is compressed to a shape somewhat as shown in Figure 2. Grease is now forced into the bearing through the nipple and keeps the parts well lubricated. The addition of the ball bearing and associated parts relieves the threaded portion of the bearing from lateral strain and prevents excessive wear of the threads. The pressure due to the compression of the grease seal washer, which is preferably made from synthetic rubber such as Neoprene or Duprene which is not deleteriously affected by grease or oil, keeps the cooperating threads in resilient contact.

Particular attention will now be directed to some special features which might otherwise be overlooked but which are of importance.

The ball bearing has been specially designed for this use and consists of upper and lower ball races 26 and 27 respectively, which are identical with the exception that the lower race has its lower outer corner chamfered. The races are surrounded and held in place by a cup 21. The bearing is surmounted by a bearing retainer washer 22 whose edge that surrounds the central opening is turned downwardly, as indicated at 29. The outer wall extends in a downward direction. The grease seal ring 24 has a planar upper surface and has its lower outer corner beveled as indicated at 30.

The top cupped washer 25 has its top frusto-conical as shown most clearly in Figure 4. The depression in the top is primarily so that rib 14 will have a depressed seat as shown in Figure 2. The inwardly tapering top 31 terminates in a downwardly curved edge 32 and has at least two diametrical notches 33 for the reception of the positioning fins 34 on the under side of rib 14. The function of fins 34 and cooperating notches 33 is to prevent the seal ring from rotating relative to top 31 and assure that, when arm 12 turns relative to the threaded section 13 of the bracket, the relative rotation will take place at the ball bearing and the cooperating threads will at all times be urged against each other with considerable force. When the several parts shown in Figure 4 are positioned between rib 14 and idler arm 12 as shown, the bearing works smoothly with no tilting of plug 13 in the threaded opening 19 of bearing 17. The links of the steering mechanism are supported from both sides of the chassis frame and are subjected to less wearing strain than when supported at one end only. The relative tilting of plug 13 and bearing nut 17 is prevented and the steering gear operates with exceptional smoothness. Attention is called to the fact that the threaded connection between threaded plug 13 and the elongated nut 17 is in effect a thrust bearing adopted for the purpose of the change over of old equipment.

What is claimed as new is:

1. A combined coupling and bearing for interconnecting a first member and a second member for relative oscillatable movement, the first member having a circular rib adjacent one end, that part beyond the rib being threaded forming a threaded plug, the second member having an axial opening threaded for the reception of the plug, said second member having a portion of its outer surface threaded, a third member having a threaded opening in threaded engagement with the threaded portion on the outer surface of said second member, that side of the third member facing the first member forming an abutment, the plug receiving end of the second member projecting beyond the abutment surface of the third member, a thrust type ball bearing encircling the end of said second member with one side resting on the abutment surface, a cupped washer positioned on the plug with its open side facing the ball bearing and a resilient seal ring positioned in said washer with one side thereof facing the bearing, in position to be forced against the bearing by the rotation of the plug in one direction in the threaded opening in the second member, said seal ring forming a grease seal and forming means for subjecting the cooperating threads on the plug and in the opening in the second member to a resilient pressure.

2. A device in accordance with claim 1 in which a cup washer is positioned between the grease seal ring and the ball bearing, the side flange of said cup washer encircling the ball bearing.

3. A device in accordance with claim 1 in which the cupped washer adjacent the rib on the first member has its upper surface dished to receive the rib and in which the rib and said cupped washer has cooperating latch elements that resist relative rotation.

4. A combined coupling and bearing for interconnecting a first member and a second member for relative oscillatable movement, the first member having a circular rib positioned some distance from its end leaving a plug portion forming a portion of a thrust bearing, the second member having an axial opening for the reception of the bearing plug, the plug and the said second member having a thrust bearing means operatively interconnecting them for relative oscillation about the axis of the plug, that side of the second member that faces the rib on the first member forming an abutment, said bearing means having a thrust type ball bearing encircling the bearing plug in the space between said abutment surface of the said second member and the rib on the plug portion of the first member, a cupped washer positioned on the plug portion adjacent the rib, the open side thereof facing towards the bearing, a second cupped washer positioned on the plug portion between the ball bearing and the first mentioned washer, said second cupped washer resting on the bearing with a portion of the bearing positioned in the washer, and a resilient seal ring positioned in the cup portion of the first cupped washer with its lower surface facing the second washer and means for placing said seal ring under compression.

References Cited in the file of this patent

UNITED STATES PATENTS

| Number | Name | Date |
| --- | --- | --- |
| 2,048,324 | Diehl | July 21, 1936 |
| 2,253,436 | Leighton | Aug. 19, 1941 |
| 2,394,686 | Hammond | Feb. 12, 1946 |
| 2,650,844 | Shemorry | Sept. 1, 1953 |